Oct. 15, 1929.                D. D. TRACY                1,731,991
WATERPROOF CONDUIT
Filed April 26, 1926
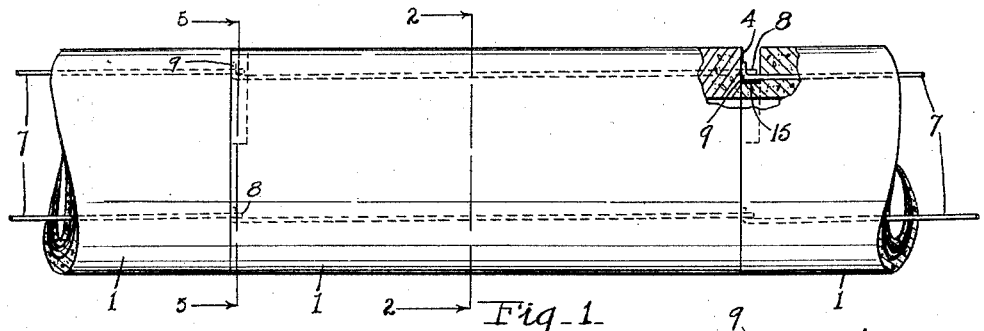
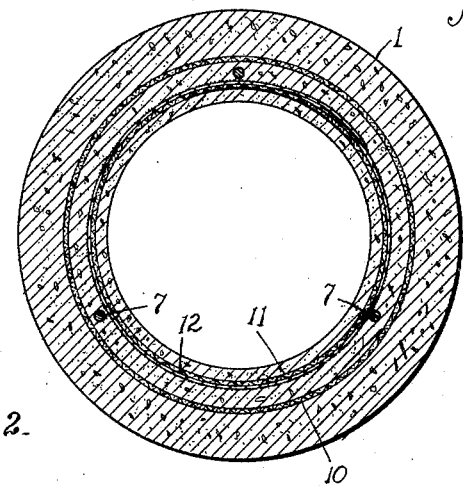
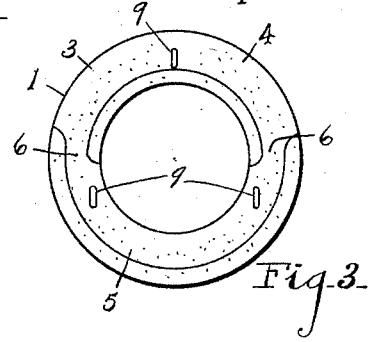
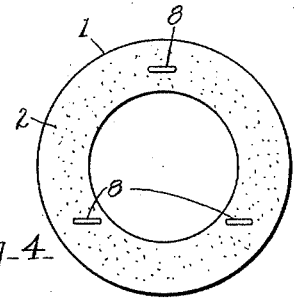
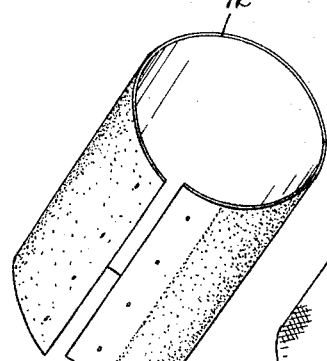
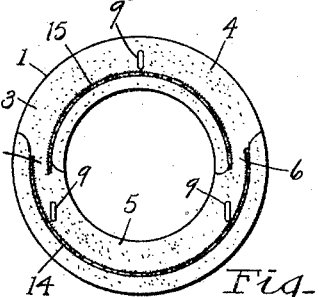
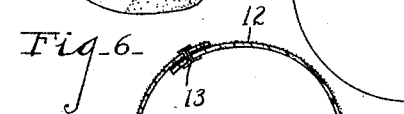
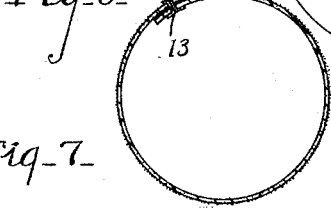
INVENTOR
David D. Tracy
BY Chappell & Earl
ATTORNEYS Patented Oct. 15, 1929

1,731,991

UNITED STATES PATENT OFFICE

DAVID D. TRACY, OF JACKSON, MICHIGAN

WATERPROOF CONDUIT

Application filed April 26, 1926. Serial No. 104,663.

The main object of this invention is to provide an improved sectional conduit of cement composition or concrete which is water and gas proof and well adapted as a conduit for water or gas under relatively high pressures.

A further object is to provide a conduit having these advantages which is economical in structure and easily laid.

Objects pertaining to details and economies of my invention will definitely appear from the detailed description to follow. The invention is clearly defined and pointed out in the claim.

A structure embodying the features of my invention is clearly illustrated in the accompanying drawing forming a part of this application, in which:

Fig. 1 is a fragmentary side elevation of a conduit embodying the features of my invention.

Fig. 2 is a transverse section on a line 2—2 of Fig. 1.

Fig. 3 is an end view of one of the conduit sections looking from the left of the section as laid in Fig. 1.

Fig. 4 is a view of the opposite end of the conduit section.

Fig. 5 is an end view corresponding to Fig. 3 with strips of waterproofing material laid in the joint channels.

Fig. 6 is a perspective view of a strip of water proofing material with its edges detached.

Fig. 7 is an end view of one of the waterproof elements formed into a cylinder.

Fig. 8 is a perspective view of one of the reinforcing elements.

In the accompanying drawing I have not endeavored to maintain the relative proportions of parts, that is, the thickness of the walls of the conduit, diameter of the tie rods and the like.

The conduit sections 1 are formed of concrete or other molded material and are provided with a flat face 2 at one end and a channel joint face 3 at the other end, there being an external joint channel 4 embracing substantially the upper half of the conduit and an internal joint channel 5 embracing substantially the lower half, these joint channels communicating at 6.

The sections are laid end to end in abutting relation and these joint channels are filled with cement, asphalt or other suitable plastic joint sealing material.

Each section is provided with tie rods 7 which are embedded therein with eyes 8 projecting from the flat end surface thereof and hooks 9 projecting into the channels so that the eyes may be engaged over these hooks. These parts described are substantially as shown in my Letters Patent #1,639,867, granted August 23, 1927.

In the embodiment illustrated I provide concentric cylindrical reinforcing elements 10 and 11 preferably formed of wire, the rods 7 being arranged between these reinforcing elements. Around the inner reinforcing element I arrange a covering 12 of waterproofed fabric, tarred or asphalt saturated paper being found very satisfactory. The surface of this paper is coated with granular material such as sand, the sand being embedded or partially embedded in the asphalt providing a surface with which the concrete effectively unites.

This waterproofing element is in the embodiment illustrated formed with overlapped edges secured in overlapped relation by the bendable fasteners 13. The waterproofing material is effectively supported by the reinforcing element which forms an effective bonding means for the concrete at the inner side thereof and the concrete effectively unites with the waterproofing element.

I thus secure a conduit unit which is well adapted to carry water or gas under high pressures. At the joints I preferably employ strips 14 and 15 of the same waterproofing material, these strips being arranged in the bottom of the joint channels prior to filling with the plastic joint material such as concrete.

Having thus described my invention what I claim as new and desire to secure by Letters Patent is:

A sectional conduit comprising tubular sections each having a flat end face at one end and a channeled face at the other, there being an external top joint channel and an internal bottom joint channel, said channels communicating at their ends, concentrically disposed foraminated cylindrical reinforcing elements embedded in said sections, coverings of waterproofed fabric around the inner reinforcing elements, tie rods embedded in said sections disposed between said reinforcing elements and having vertically disposed hooks projecting into the joint channels and coacting eye loops projecting from the flat end faces, and means for sealing said joint channels comprising strips of waterproofing material arranged on the bottoms thereof and below the projecting ends of said tie rods prior to filling with a plastic sealing material.

In witness whereof I have hereunto set my hand.

DAVID D. TRACY.